US005597497A

United States Patent [19]

Dean et al.

[11] Patent Number: 5,597,497

[45] Date of Patent: Jan. 28, 1997

[54] SWITCH MECHANISM FOR OPERATING A PLASMA ARC TORCH, OTHER TOOLS OR WEAPONS

[75] Inventors: James C. Dean, Lebanon, N.H.; Robert C. Dean, Jr., Norwich, Vt.; E. Hubbard Yonkers, Contoocook, N.H.

[73] Assignee: Hypertherm, Inc., Hanover, N.H.

[21] Appl. No.: 359,909

[22] Filed: Dec. 20, 1994

[51] Int. Cl.[6] .................................................. B23K 10/00

[52] U.S. Cl. ................................ 219/121.48; 219/86.21; 219/121.59; 219/121.39; 222/473; 42/70.06

[58] Field of Search ......................... 219/121.48, 121.54, 219/137.31, 137.7, 86.21, 121.59, 74, 75, 121.39; 222/146 HE, 323, 230, 473; 42/70.02, 70.06

[56] References Cited

U.S. PATENT DOCUMENTS

| | | | |
|---|---|---|---|
| 3,827,171 | 8/1974 | Smith | 42/69 B |
| 3,971,492 | 7/1976 | Lockwood | 222/146 HE |
| 4,245,759 | 1/1981 | Baker et al. | 222/146 HE |
| 4,681,998 | 7/1987 | Kon | 219/99 |
| 5,039,837 | 8/1991 | Nourbakhsh et al. | 219/121.48 |
| 5,208,441 | 5/1993 | Broberg | 219/121.52 |
| 5,388,362 | 2/1995 | Melcher | 42/70.02 |

*Primary Examiner*—Mark H. Paschall

*Attorney, Agent, or Firm*—Testa, Hurwitz & Thibeault, LLP

[57] ABSTRACT

A switch mechanism with a safety member for operating a tool or a weapon which reduces the probability of inadvertent operation. The switch mechanism comprises a trigger and a safety member disposed adjacent to the trigger for preventing the trigger from contacting an actuation switch. The safety member is shaped such that when it is positioned in a first position, it prevents the trigger from contacting the switch. In addition, the safety member is shaped such that when the safety member is positioned in a second position, it allows the trigger to contact the actuation switch.

23 Claims, 5 Drawing Sheets

SWITCH MECHANISM FOR OPERATING A PLASMA ARC TORCH, OTHER TOOLS OR WEAPONS

FIELD OF THE INVENTION

The invention relates to a switch mechanism for a tool or a weapon. In particular, the invention relates to an improved switch mechanism for a plasma arc torch which includes a safety device and a method of operating such a switch mechanism.

BACKGROUND OF THE INVENTION

Plasma arc torches are widely used in the cutting of metal workpieces. A plasma arc torch generally includes a torch body, an electrode mounted within the body, a nozzle with a central exit orifice, electrical connections, passages for cooling and arc control fluids, a swirl ring to control the fluid flow patterns, a power supply and a means to control the operation of the torch.

A plasma arc torch generates a constricted ionized jet of plasma gas with high temperature and high momentum. The plasma jet exits from the nozzle orifice of the torch typically at a temperature of between 15,000–50,000 degrees centigrade at a typical velocity of up to 7,000 m/s. A plasma jet with these temperatures and velocities produces extreme rates of heat transfer which are necessary to cut rapidly through metals. Such extreme rates of heat transfer result in a serious hazard of traumatic burns to the operator and other workers in close proximity to the jet exiting the plasma arc torch. The operating instructions for commercial plasma arc torches usually instruct the operator to disable the power supply before disassembling the torch for service or when leaving the plasma arc torch unattended and warn the operator of possible injuries resulting from a failure to follow correct operating procedures. It is, however, frequently observed in practice that operators fail to follow the manufacturer's instructions and warnings.

Plasma arc torches are usually trigger-activated devices. That is, the torch generates a plasma stream in response to operator activation of a trigger. Accidents can occur when the operator uses the torch without turning off the power supply and inadvertently activates the trigger controlling the plasma stream. Accidents can also occur with plasma arc torches when the operator places the torch body on a hard surface while attending to other tasks. In this event, the trigger can be inadvertently activated if objects like clothing or building materials are placed on top the torch. Additionally, accidents can occur if a torch is dropped such that its trigger strikes a solid object. Further, operators sometimes fail to disable the is plasma arc torch power supply when changing consumable parts from the torch body. Replacement of consumable components often requires gripping the torch body, in the proximity of the control switch, while removing the torch cap to access consumable parts. Most plasma arc torches contain safety devices so that, if the torch is disassembled, the power supply and thus the torch is deactivated. Unfortunately, these safety devices occasionally fail and sometimes indicate to the power supply that the cap is connected when in fact, it is not. In this event, if the operator removes the cap to exchange consumable parts and inadvertently compresses the trigger, the operator can be severely burned, usually on the hand. These burns can be very deep and can even sever tissue.

Many other trigger-activated tools and weapons such as welding torches, saws, drills, hammers, nailers, drivers, guns, explosive detonators, and artillery rockets have similar hazards associated with their trigger mechanisms.

It is therefore a principal object of this invention to reduce the probability of inadvertent operation of tools and weapons, in particular plasma arc torches, by utilizing a switch mechanism with a safety device that is deactivated by the operator prior to use.

Another principal object of the invention is to provide a switch mechanism that is inexpensive, reliable and easy to manipulate.

SUMMARY OF THE INVENTION

Generally, the present invention features a switch mechanism for a device (i.e. a weapon or gun) which prevents inadvertent operation of the device. The switch mechanism includes a trigger disposed in a device housing and a support member disposed adjacent to the back surface of the trigger. A switch for operating the device is responsive to displacement of the trigger. A displaceable safety member is disposed adjacent to the front surface of the trigger for preventing the trigger from contacting the switch. When the safety member is positioned in a first position, it prevents the trigger from contacting the switch. When the safety member is positioned in a second position, it allows the trigger to contact the switch.

In accordance with the present invention, the support member supports the trigger at one end and is compressible such that it allows the trigger to contact the switch. The safety member is shaped to define a cam at a first end and a lever at a second end. The cam shape is such that when the safety member is in the first position, it contacts the housing, thereby preventing the trigger from contacting the switch. In addition, the cam is shaped such that when the safety member is in the second position, it allows the trigger to contact the switch. A positioning member forces the safety member in the first position absent exposure to an external force, thereby rendering the device inoperable. In addition, the positioning member allows the safety member to be positioned in the second position when an appropriate external force is applied. Appropriate external force may be applied by an operator using the device.

The present invention has particular applicability to plasma arc torches. That is, the present invention also features a plasma arc torch for piercing or cutting a workpiece which includes a torch body, a power supply electronically coupled to the torch body, and a switch mechanism for operating the torch disposed in the torch body. The switch mechanism comprises a trigger and a safety member disposed adjacent to the trigger for preventing the trigger from contacting a switch.

More particularly, the switch mechanism includes a trigger mounted in the torch housing and a support member disposed adjacent to the back surface of the trigger. The switch for operating the torch is responsive to displacement of the trigger. The displaceable safety member is disposed adjacent to the front surface of the trigger. A positioning member positions the safety member in a first position (i.e., a rest position) absent an external force in which the safety member prevents the trigger from contacting the switch. When an adequate external force is applied to the safety member, the operator positions the safety member in a second position (i.e., an operating position) in which the trigger is positionable to contact the switch.

The present invention also features a method of operating a plasma arc torch having a switch mechanism which includes a safety device. The method includes positioning the plasma arc torch relative to a workpiece, displacing the safety member from a first position which prevents torch operation to a second position which permits torch operation, and applying a force to the trigger sufficient to allow contacting of the switch and operation of the torch.

A switch mechanism incorporating the principles of the present invention offers significant safety advantages. One advantage is that operators of trigger-activated tools and weapons can work around and operate such devices in relative safety since the present invention prevents inadvertent operation. Another advantage is that operators of plasma arc torches can replace consumable parts in relative safety without concern for inadvertently activating the torch and possibly inflicting severe burns on themselves or others.

BRIEF DESCRIPTION OF THE DRAWINGS

The foregoing and other objects, features and advantages of the is invention will become apparent from the following more particular description of preferred embodiments of the invention, as illustrated in the accompanying drawings. The drawings are not necessarily to scale, emphasis instead being placed on illustrating the principles of the present invention.

DETAILED DESCRIPTION

Figure 1:
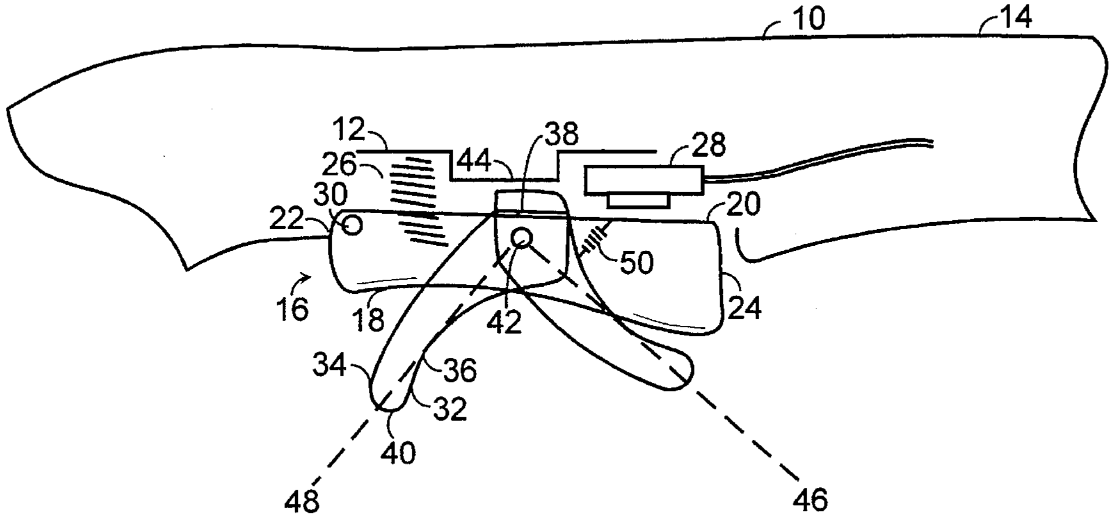
FIG. 1 is an exploded diagram of a switch mechanism for operating a plasma arc torch.

FIG. 1 illustrates a switch mechanism which activates a tool or weapon but, which additionally allows safe handling of the tool or weapon. The switch mechanism is positioned within a housing 10 of a tool or weapon having an internal surface 12 and an external surface 14. In accordance with the present invention, a trigger 16 having a front surface 18 external to the housing, a back surface 20 internal to the housing, and first 22 and second 24 end is supported by a supporting member 26. The supporting member is typically a spring compressed between the back surface of the trigger 20 and the internal surface of the housing 12. Generally, the trigger 16 is concave in shape and sufficiently large to enable an operator to activate the trigger while wearing protective gloves.

A switch or other mechanism 28 for operating the tool or weapon responsive to displacement of the trigger is positioned internal to the housing. The trigger is positioned partially within the housing and rotates relative to the housing about a traverse axis 30 extending through the first end of the trigger. When the trigger is rotated counterclockwise (i.e. towards the housing), it contacts the switch. When the trigger is rotated clockwise (i.e. away from the housing), it rests against an internal surface of the housing.

A displaceable safety member 32 having a front surface 34, a back surface 36, a first end 38, and a second end 40 prevents the trigger from contacting the switch. The safety member is disposed adjacent to the front surface of the trigger and rotates relative to the trigger about an axis defined by a rotation member 42 and extending traversely through the first and second end of the safety member. The first end of the safety member is shaped (i) to contact an internal surface of the housing 44 when the safety member is positioned in a first position 46 (i.e. rest position) and (ii) to allow the trigger to contact the switch when positioned in a second position 48 (i.e. operating position). Generally, the front surface of the safety member is concave in shape and sufficiently large so that it can be displaced by an operator wearing protective gloves.

A positioning member 50, responsive to the safety member and the trigger, positions the safety member in the first position absent an external force. The safety member thus is normally positioned to prevent the trigger from contacting the switch. Consequently, if the operator grasps the torch or weapon handle and inadvertently squeezes the trigger, the tool or weapon will not operate. In addition, the positioning member has substantial flexibility to allow an operator to displace the safety member from the first position to the second position where the trigger is positionable to contact the switch to activate the tool or weapon. The positioning member is typically a spring tensioned between the back surface of the safety member and the back surface of the trigger.

Generally, the switch mechanism is useful in a variety of tools, weapons or the like. However, it has been found that the switch mechanism is particularly useful in a plasma arc torch.

Figure 2:
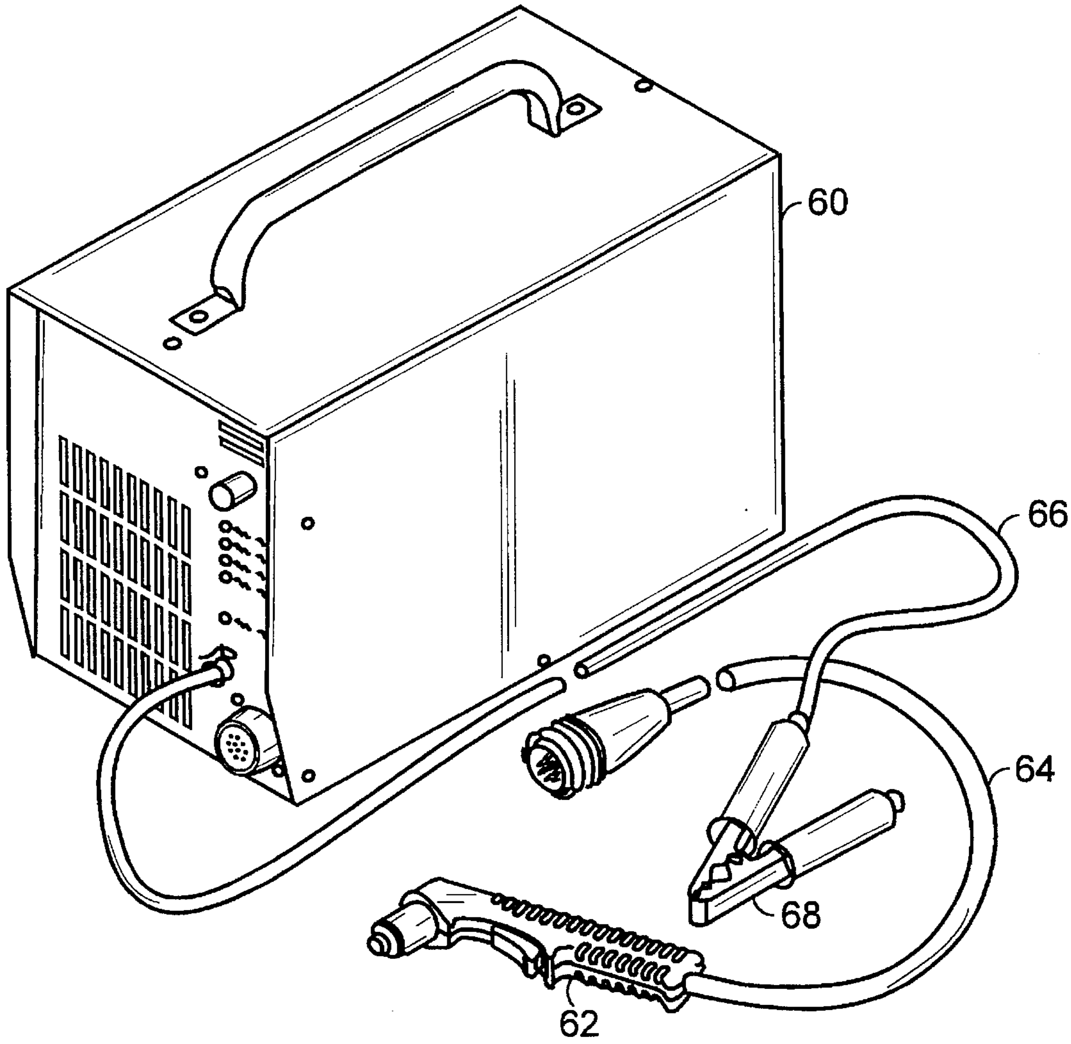
FIG. 2 is a diagram of a plasma arc torch power supply and a torch body used for cutting or piercing a metal workpiece.

FIG. 2 illustrates a plasma arc torch system representative of any of a variety of models of torches. A power supply 60 provides continuously variable current output ranging from about 20 to 40 amperes. This range can be lower or higher depending on the thickness the workpiece and the desired cutting speeds. The variable power supply allows for wide variations in cutting speeds for a given thickness of metal.

A torch body 62 configured for hand cutting is connected to the power supply by a hose 64. The hose provides the torch body with a plasma gas from a gas source (not shown) and electrical power from the power supply to ignite and sustain a plasma stream. Air may be used as the plasma gas, but other gases may also be used to improve cut quality on metals such as stainless steel and aluminum. A ground cable 66 provides a return path for the current generated by the power supply and is typically connected to a work piece (not shown) by a clamp 68.

Figure 3:
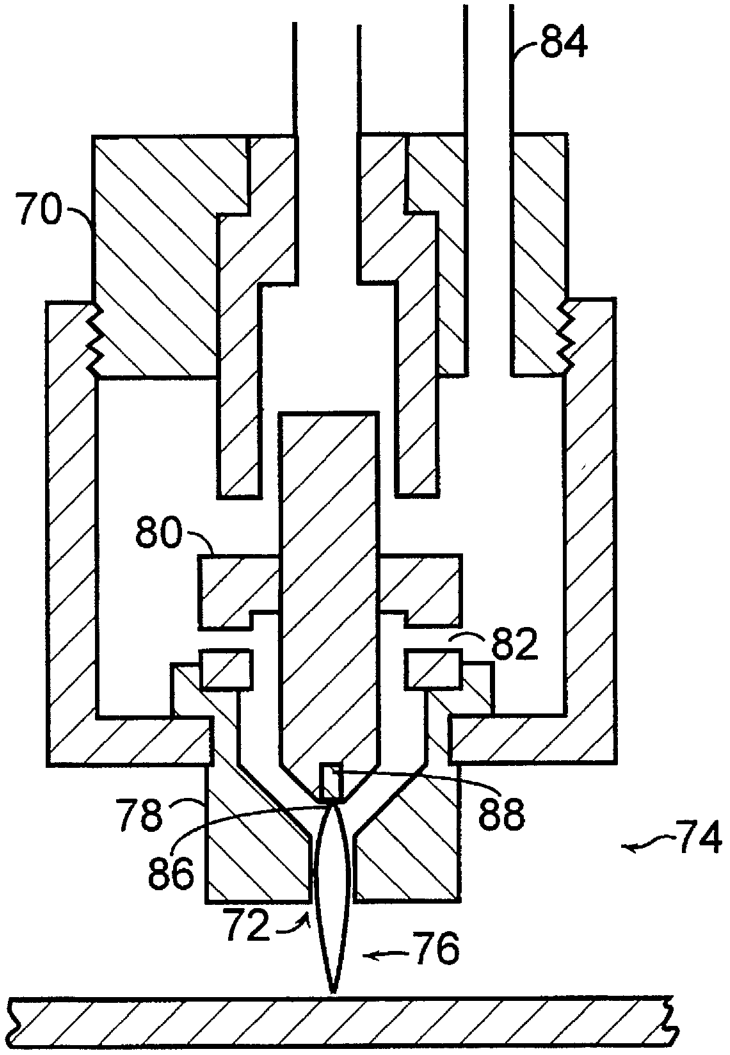
FIG. 3 is a cross-sectional view of a conventional plasma arc torch.

FIG. 3 illustrates in simplified schematic form a typical plasma arc torch representative of any of a variety of models of torches. The torch has a body 70 which is generally cylindrical with an exit orifice 72 at a lower end 74. A plasma arc 76, i.e. an ionized gas jet, passes through the exit orifice. The torch is used to pierce and cut metal, such as mild steel or other electrically-conducting materials, in a transferred arc mode. In cutting mild steel, the torch operates with a reactive gas, such as oxygen or air, as the plasma gas to form the transferred plasma arc.

The torch body supports an electrode having an insert press fit into its lower end and a nozzle 78 spaced from the electrode. The nozzle has a central orifice that defines the exit orifice. A swirl ring 80 mounted to the torch body has a set of radially offset (or canted) gas distribution holes 82 that impart a tangential velocity component to the plasma gas flow causing it to swirl. This swirl creates a vortex that constricts the arc and stabilizes the position of the arc on the insert.

In operation, the plasma gas flows through a gas inlet tube 84 and the gas distribution holes. From there, the gas flows into the plasma chamber 86 and out of the torch through the nozzle orifice. A pilot arc, which ionizes the gas passing through the nozzle orifice, is first generated between the electrode 88 and the nozzle. The arc then transfers from the nozzle to the workpiece. It is noted that the particular construction details of the torch body, including the arrangement of components directing of gas and cooling fluid flows and providing electrical connects, can take a wide variety of forms.

Both the electrode and the nozzle are consumable parts and require replacement after one or more arc hours of operation. While replacing consumables, it is extremely important that the torch body be electrically disconnected from the power supply. As noted previously, the plasma jet is typically at a temperature of between 15,000–50,000 degrees centigrade and typically moves at a velocity of up to 7,000 m/s. A plasma stream with these temperatures and velocities can result in a serious hazard of traumatic burns for the operator and other workers in close proximity to the torch. In addition, such extreme rates of heat transfer can cause fires or explosions if the plasma stream is directed at combustible material and may result in loss of life or property.

Figure 4:
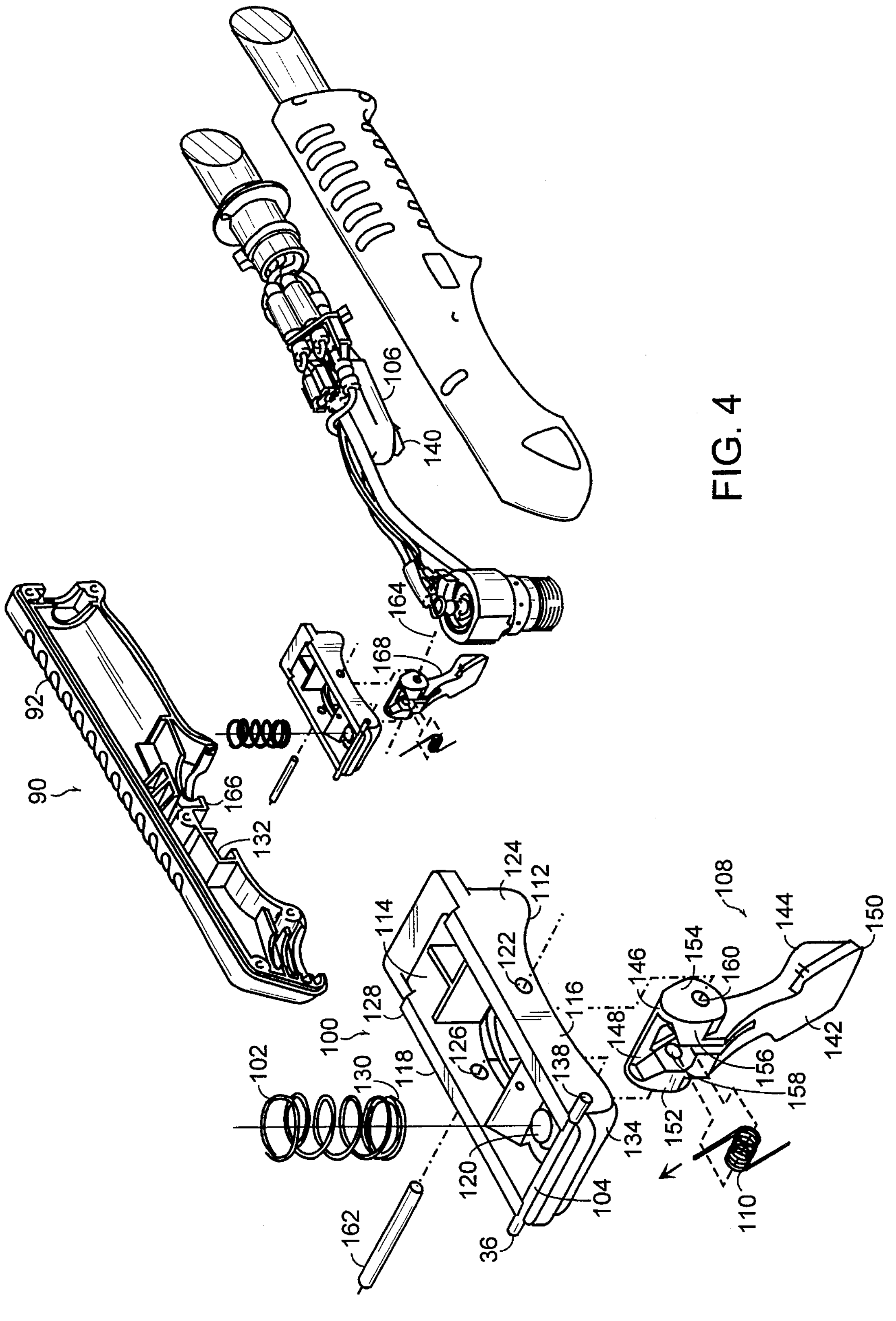
FIG. 4 is an exploded diagram of a plasma arc torch body shown in FIG. 2.

FIG. 4 is an exploded diagram of a switch mechanism for operating a plasma arc torch. The torch is enclosed in a torch housing 90 having an outer surface and a multitude of inner surfaces. Generally, the switch mechanism includes a trigger 100, a trigger positioning spring 102, a trigger rotation pin 104, a switch 106, a safety member 108, and a safety member positioning spring 110.

The trigger has a concave outer surface 112 external to the torch housing and an inner surface 114 internal to the housing. A center aperture 116 is positioned through the center of the inner and outer surfaces of the trigger. The inner surface of the trigger includes a shelf 118 for positioning the safety member and a spring guide 120 for positioning the trigger positioning spring 102. In addition, the trigger has a first side aperture 122 through a first side 124 and a second side aperture 126 through a second side 128.

A first end of the trigger positioning spring abuts the first spring guide 120. A second end of the trigger positioning spring abuts the inner surface 132 of the torch housing. Thus, the trigger positioning spring is compressed between the inner surface of the trigger and the inner surface of the torch housing.

The trigger rotation pin 104 is juxtaposed with a first end 134 of the is trigger. A first 136 and a second 138 ends of the trigger rotation pin are positioned within apertures forming the inner surface of the torch housing (not shown). The trigger rotation pin allows the trigger to rotate relative to the torch housing.

The switch 106 for operating the torch is positioned within the torch housing. The switch is typically an actuator-type electrical switch which is activated by displacing an actuator element 140 a certain minimum distance, usually several millimeters. When activated, the switch makes an electrical connection between a first and second wire (not shown) connected to the power supply (not shown), thereby allowing power from the power supply to reach the torch body. The switch is positioned such that the trigger is positionable to displace the actuator the minimum distance if the trigger is not blocked by the safety member 108.

The safety member 108 has a front surface 142, a back surface 144, a cam 146 at a first end 148, and a lever at a second end 150. The cam has a first 152 and a second side 154, a top outer surface 156, an inner surface 158, and an aperture 160 through both sides. The safety member is mounted s within the center trigger aperture by a safety member rotation pin 162 positioned traversely through the cam aperture and the side trigger apertures such that the safety member is rotatable relative to the trigger.

The outer surface of the cam is shaped such that when the safety member is positioned in a first position 164, the outer surface of the cam contacts an inner surface of the housing 166, thereby preventing the trigger from contacting the switch. In addition, when the safety member is in a second position 168, the cam is free from the inner surfaces of the housing such that the trigger is positionable to contact the switch.

The safety member positioning spring 110 forces the safety member in the first position absent an external force. The safety member is thus normally positioned to prevent the trigger from contacting the switch. Consequently, if the operator grasps the torch body and inadvertently squeezes the trigger, the torch will not operate. In addition, the safety member positioning spring is compressible to allow an operator to displace the safety member from the first position to the second position, where the trigger is positionable to contact the switch and thus activate the torch. The safety member positioning spring is typically positioned around the safety member rotation pin 162 and is compressed between the inner surface 158 of the cam and the shelf 118 of the trigger.

In an alternative embodiment, the outer surface of the cam may be further shaped such that when the safety member is positioned against the first end of the trigger (i.e. rotated fully clockwise), the outer surface of the cam contacts an inner surface of the housing (not shown) and consequently prevents the trigger from contacting the switch and operating the torch. A torch utilizing this embodiment prevents an operator from effectively defeating the safety feature of this invention by permanently positioning the safety member against the first end of the trigger with a stationary object such as a rubber band, wire or tape.

Figure 5A:
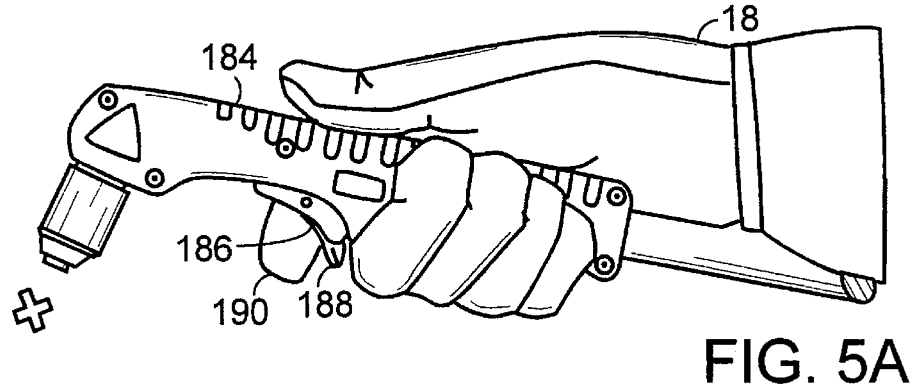
FIG. 5A–5C shows a method of operating a plasma arc torch with a switch mechanism containing a safety member.
Figure 5B:
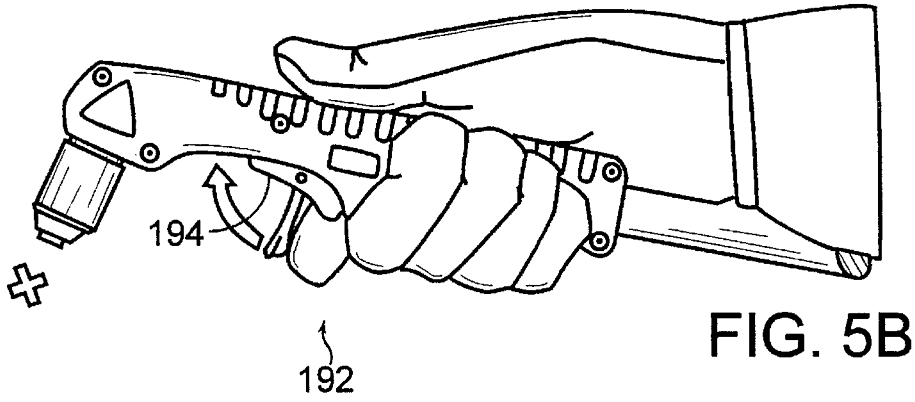
Figure 5C:
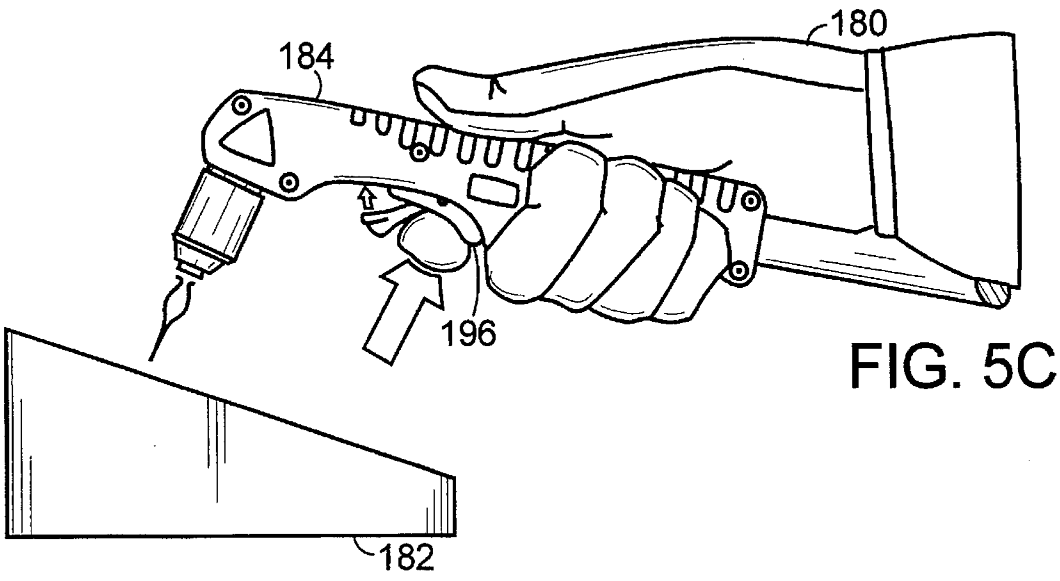

FIGS. 5A–5C show a method of operating a plasma arc torch with a switch mechanism containing a safety member. FIGS. 5A–5C generally illustrates an operator 180 cutting or piercing a workpiece 182 using a plasma arc torch 184 with a switch mechanism 186 containing a safety member 188. In FIG. 5A, an operator 180 positions the torch 184 relative to a workpiece 182. In FIG. 5B, the operator uses a finger 190 to displace a safety member 188 from the first position 192 which prevents torch operation to the second position 194 which permits torch operation. In FIG. 5C, the operator uses a finger to displace a trigger 196 more then a few millimeters, thereby igniting and sustaining operation of the plasma arc torch.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A plasma arc torch for piercing or cutting a workpiece, comprising:

a torch body;

a power supply electronically coupled to the torch body; and a switch mechanism for operating the torch disposed in the torch body, including a trigger;

a safety member disposed adjacent to the trigger and having a rest position for preventing the trigger from contacting the switch and having a second position for allowing the trigger to contact the switch; and a positioning member that positions the safety member in the rest position absent an external force.

2. A switch mechanism for operating a device, comprising:

a trigger having front and back surfaces and first and second ends and disposed in a device housing;

a support member disposed adjacent the back surface of the trigger for supporting the trigger within the housing of the device;

a switch for operating the device responsive to displacement of the trigger;

a safety member disposed adjacent to the front surface of the trigger for preventing the trigger from contacting the switch when the safety member is positioned in a rest position and for permitting the trigger to contact the switch when the safety member is positioned in a second position;

a positioning member that positions the safety member in the rest position absent an external force.

3. The switch of claim 2 wherein the support member is a spring compressed between the back surface of the trigger and the housing of the device.

4. The switch of claim 2 further comprising a positioning member responsive to the safety member and the trigger for positioning the safety member in a first position in which the safety member prevents the trigger from contacting the switch and in a second position in which the trigger is positionable to contact the switch.

5. The switch of claim 4 wherein the positioning member is a spring compressed between the safety member and the trigger.

6. The switch of claim 4 wherein the safety member is shaped to define a cam disposed adjacent the first end of the trigger such that the cam (i) contacts the housing to prevent the trigger from contacting the switch when the safety member is in the first position and (ii) allows the trigger to contact the switch when the safety member is in the second position.

7. The switch of claim 4, wherein the safety member rotates between the first and second position of the safety member about an axis defined by a rotation member which extends traversely through the cam.

8. The switch of claim 7, wherein the rotation member is a pin positioned traversely through the trigger and the cam.

9. The switch of claim 8, wherein the spring surrounds the pin and is compressed between an inner surface of the cam and the back surface of the trigger.

10. The switch of claim 2, wherein the trigger rotates about a transverse axis extending through the first end of the trigger.

11. The switch of claim 2, where the device is a tool or a weapon.

12. The switch of claim 2, where the device is a plasma arc torch.

13. A switch mechanism for a plasma arc torch, comprising:

a trigger for initiating operation of the torch having front and back surfaces and first and second ends being disposed in a torch body;

a support member disposed adjacent the back surface of the trigger for supporting the trigger at the first end within the body;

a switch for operating the torch responsive to displacement of the trigger; and a safety member disposed adjacent the front surface of the trigger in a rest position that prevents operation of the torch, the safety member being displaceable, by an external force, to a second position which permits operation of the torch.

14. The switch of claim 13, wherein the support member is a spring compressed between the back surface of the trigger and the housing.

15. The switch of claim 13, further comprising a positioning member for positioning the safety member in a first position absent an external force wherein the safety member prevents the trigger from contacting the switch and, when an external force is applied, positioning the safety member in a second position wherein the trigger is positionable to contact the switch.

16. The switch of claim 15, wherein the positioning member is a spring compressed between the safety member and the trigger.

17. The switch of claim 13, wherein the safety member is shaped so as to define a cam disposed adjacent the first end of the trigger such that the cam (i) contacts the housing and thereby prevents the trigger from contacting the switch when the safety member is in the first position and (ii) allows the trigger to contact the switch when the safety member is in the second position.

18. The switch of claim 13, wherein the safety member rotates between the first and second position about an axis defined by a pin which extends traversely through the cam and the trigger.

19. A method of operating a switch mechanism for controlling a device, comprising the steps of:

providing a switch having a safety member, the safety member prevents operation of the device when disposed in a rest position;

displacing the safety member with a finger of an operator's hand so as to expose a surface of a trigger and position a cam so as to permit operation of the device; and applying a force to the trigger with the finger sufficient to contact a switch which controls the operation of the device.

20. A method of operating a plasma arc torch for cutting or piercing a workpiece comprising the steps of:

providing a plasma arc torch having a trigger for activating the torch and a safety member for preventing activation of the torch;

positioning the plasma arc torch relative to the workpiece;

applying an external force to displace the safety member from a rest position which prevents torch operation to a second position which permits torch operation; and applying a force to displace the trigger to ignite and sustain the plasma arc torch.

21. The method of operating a plasma arc torch of claim 20, wherein the trigger is depressed more than 2 millimeters.

22. The method of operating a plasma arc torch of claim 20, wherein an operator places an object between the safety member and the trigger so as to translate the safety member from the first position to the second position.

23. The method of claim 22, wherein the object is an operator's finger.

* * * * *